United States Patent
Niikura (10) Patent No.: US 7,769,005 B2
(45) Date of Patent: Aug. 3, 2010

(54) CONTROL METHOD OF COMMUNICATION APPARATUS, COMMUNICATION APPARATUS, AND CONTROL PROGRAM OF COMMUNICATION APPARATUS

(75) Inventor: Yasuhito Niikura, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 778 days.

(21) Appl. No.: 11/177,285

(22) Filed: Jul. 11, 2005

(65) Prior Publication Data

US 2006/0013220 A1    Jan. 19, 2006

(30) Foreign Application Priority Data

Jul. 14, 2004   (JP)   ............... 2004-206671

(51) Int. Cl.
*H04L 12/28* (2006.01)
*H04L 12/56* (2006.01)

(52) U.S. Cl. ............ 370/389; 370/475; 370/469; 370/352

(58) Field of Classification Search ........ 370/351, 370/475, 389, 400, 401, 411; 709/245, 401, 709/201–203, 217–220
See application file for complete search history.

(56) References Cited

U.S. PATENT DOCUMENTS

| 5,701,411 | A | | 12/1997 | Tran et al. ............. 395/200.1 |
| 6,058,431 | A | * | 5/2000 | Srisuresh et al. ......... 709/245 |
| 6,480,508 | B1 | * | 11/2002 | Mwikalo et al. .......... 370/475 |
| 2003/0106067 | A1 | * | 6/2003 | Hoskins et al. ........... 725/119 |
| 2003/0164987 | A1 | | 9/2003 | Enomoto et al. |
| 2004/0073706 | A1 | * | 4/2004 | Eguchi et al. ............ 709/245 |
| 2004/0172658 | A1 | * | 9/2004 | Rakib et al. ............. 725/120 |
| 2004/0249918 | A1 | * | 12/2004 | Sunshine ................ 709/223 |
| 2005/0055306 | A1 | * | 3/2005 | Miller et al. ............. 705/37 |
| 2005/0117605 | A1 | * | 6/2005 | Yan et al. ............... 370/469 |

(Continued)

FOREIGN PATENT DOCUMENTS

JP    8-255118    10/1996

(Continued)

OTHER PUBLICATIONS

Aug. 18, 2009 Japanese Official Action in Japanese Patent Appln. No. 2004-206671 (with translation).

(Continued)

*Primary Examiner*—Ricky Ngo
*Assistant Examiner*—David Oveissi
(74) *Attorney, Agent, or Firm*—Fitzpatrick, Cella, Harper & Scinto (57) ABSTRACT

A communication apparatus generates an IP network communication path on a local interface, which is constituted of a USB between a computer and the communication apparatus, or the like, using a PPP or the like, and communicates through the IP network communication path with the computer. The computer uses a general-purpose network application like a WEB browser for accessing a resource of the communication apparatus through the local interface. In addition, the communication apparatus provides domain name service and service such as IP packet routing, and the like, for the computer through the local interface. A user in a host apparatus side can use a unified interface for the user's operation and setup operation of a communication apparatus without being limited to an interface of accessing the communication apparatus.

13 Claims, 9 Drawing Sheets

U.S. PATENT DOCUMENTS

2007/0076625 A1* 4/2007 Tahara et al. ............ 370/252

FOREIGN PATENT DOCUMENTS

JP 2003-259075 A 9/2003

OTHER PUBLICATIONS

Response Letter for the Japanese Office Action (with translation).
Masahiro Umegaki, "Devices and Techniques for Changing Home LAN into Home Network", Internet Magazine, vol. 97, Feb. 1, 2003, pp. 80-103 (with partial translation).
Masahiro Umegaki, "Revest Father's Power! Plan for Building up Home LAN for Invitation of Happiness", Internet Magazine, vol. 95, Dec. 1, 2002, pp. 94-117 (with partial translation).
Nov. 10, 2009 Japanese Official Action in Japanese Patent Appln. No. 2004-206671 (with partial translation).
Shinji Umeyama, "WinPC Labs: Realization of an Ultra High Speed Network for a Broad Band ADSL Network or an Optic Fiber Network!! A Router Can be Used to Provide a Security in a Home FTTH Connection Network.", Nikkei Win PC, vol. 10, No. 3, Mar. 1, 2004, pp. 164-165.
Yuuichiro Nakamura, "Remote Control Method of a PC in a Home from Outside the Home, the Method Can be Used in Both Windows XP System and 9x System.", ASAHI PC, vol. 344, Oct. 15, 2003, pp. 82-89.

* cited by examiner

| | |
|---|---|
| NETWORK CONNECTION DECISION PROCESS | 91 |
| NETWORK ADDRESS ACQUISITION PROCESS | 92 |
| NETWORK ADDRESS STORING PROCESS | 93 |
| HOSTNAME STORING PROCESS | 94 |
| HOSTNAME SOLUTION REQUEST RECEIVING PROCESS | 95 |
| HOSTNAME DATA DECISION PROCESS | 96 |
| HOSTNAME SOLUTION REQUESTING PROCESS | 97 |
| SOLUTION RESULT RECEIVING PROCESS | 98 |
| SOLUTION RESULT SENDING PROCESS | 99 |
| LOCAL DATA SENDING REQUEST RECEIVING PROCESS | 910 |
| LOCAL DATA DECISION PROCESS | 911 |
| PROCESS FOR SENDING LOCAL DATA TO DATA PROCESSING UNIT | 912 |
| PROCESS FOR SENDING LOCAL DATA TO NETWORK | 913 |
| NETWORK DATA RECEIVING PROCESS | 914 |
| NETWORK DATA DECISION PROCESS | 915 |
| PROCESS FOR SENDING NETWORK DATA TO DATA PROCESSING UNIT | 916 |
| PROCESS FOR SENDING NETWORK DATA TO PC | 917 |

CONTROL METHOD OF COMMUNICATION APPARATUS, COMMUNICATION APPARATUS, AND CONTROL PROGRAM OF COMMUNICATION APPARATUS

BACKGROUND OF THE INVENTION

1. Field of the Invention

The present invention relates to a control method of a communication apparatus which performs prescribed communication processing while having a local interface for connecting with a host apparatus, and a network interface for connecting with a network, the communication apparatus, and a control program of the communication apparatus.

2. Related Background Art

Up to now, a communication apparatus which is like a facsimile machine or an MFP (multifunctional peripheral) and is used by being connected to a LAN is known, and in such an apparatus, naturally, a network interface like CSMA/CD (Ethernet: proprietary name) for performing network communications with other apparatuses, for example, a PC (personal computer) and other communication apparatuses is provided. Besides the case that the handling (e.g., allocation of an IP address or the like) with regard to a network in this kind of apparatus is performed on the basis of user's manual operation, automatic handling is performed in a considerable range, and for example, an apparatus which has a plurality of network interfaces, decides which interface is connected to a network, and switches control accordingly is known (e.g., Japanese Patent Application Laid-Open No. H8-255118).

In addition, with regard to this kind of apparatus, and in particular, that which has image recording means and can be used as a printer which performs an image output, there exist some in which local interfaces such as USB or IEEE1284 for connecting with a host apparatus such as a PC are provided.

On the other hand, with regard to a user's operation and setup operation to a conventional communication apparatus, what receives operation from another PC and the like besides what is performed from an operation panel of the apparatus is known, and, any of the above-mentioned networks and local interfaces are used for this kind of application.

Up to now, when accessing the information (communication data, management information, setup information, and the like of the communication apparatus) on a communication apparatus from other apparatuses, for example, a PC via a network interface, an access is performed using an application peculiar to a network interface such as a WEB browser.

In addition, when accessing the information on a communication apparatus via a local interface from a PC, an access is performed by starting an application (including a user interface of driver software and the like) dedicated for the local interface.

In this way, up to now, there was a problem that a user had to use the software which was completely different when an interface for accessing a communication apparatus for a user's operation and setup operation to the communication apparatus differed.

SUMMARY OF THE INVENTION

A subject of the present invention is to solve the above-mentioned problems, and to make it possible for a user in a host apparatus side to use a unified user interface for the user's operation and setup operation of a communication apparatus without (a) requiring the preparation of the software accessing the communication apparatus separately in a host apparatus side for every interface accessing the communication apparatus, and (b) being limited to an interface of accessing the communication apparatus.

According to the present invention, it is not necessary to prepare software for accessing a communication apparatus for every interface of accessing the communication apparatus like the conventional, separately for a host apparatus. A user in the host apparatus side can use the same network application as general-purpose software for accessing other computers, for example, for the user's operation or setup operation of the communication apparatus without being limited to the interface of accessing the communication apparatus, and can use a unified user interface for a user.

In addition, a virtual communication path is generated on the above-mentioned local interface and a communication apparatus is made to appear like a host apparatus as an IP network resource. Hence, it is possible to provide domain name service to the above-mentioned host apparatus through the above-mentioned local interface, and to provide the service as a router which performs the routing of IP packets between the vertical IP network communication path on the local interface, the network connected to the above-mentioned network interface, and the own data processing means. Hence, without using special server hardware or router hardware, these services can be provided for the host apparatus by the communication apparatus.

DESCRIPTION OF THE PREFERRED EMBODIMENTS

Hereafter, an embodiment with regard to a communication apparatus which is connected to a PC (hereafter, this is also simply described as a computer) through a local interface and is used while being connectable with a network through a network interface, will be shown as an embodiment of the present invention.

In the following, in order to be able to use the same user interface for performing a user's operation and setup operation of a communication apparatus from a PC side without being limited to an interface of accessing the communication apparatus, it is made to be able to use the same application (e.g., WEB browser) as what is usually used for a resource on a network when accessing from the PC to the communication apparatus through a local interface.

In addition, it is made that a communication apparatus can provide service as a router, which performs the routing of input-output packets to a PC, and also as a DNS (domain name server). Thereby, even if network connection is not performed in another path (or, even if it does not have a network interface), the PC can exploit the resource on the network through this communication apparatus.

Embodiment 1

Figure 1:
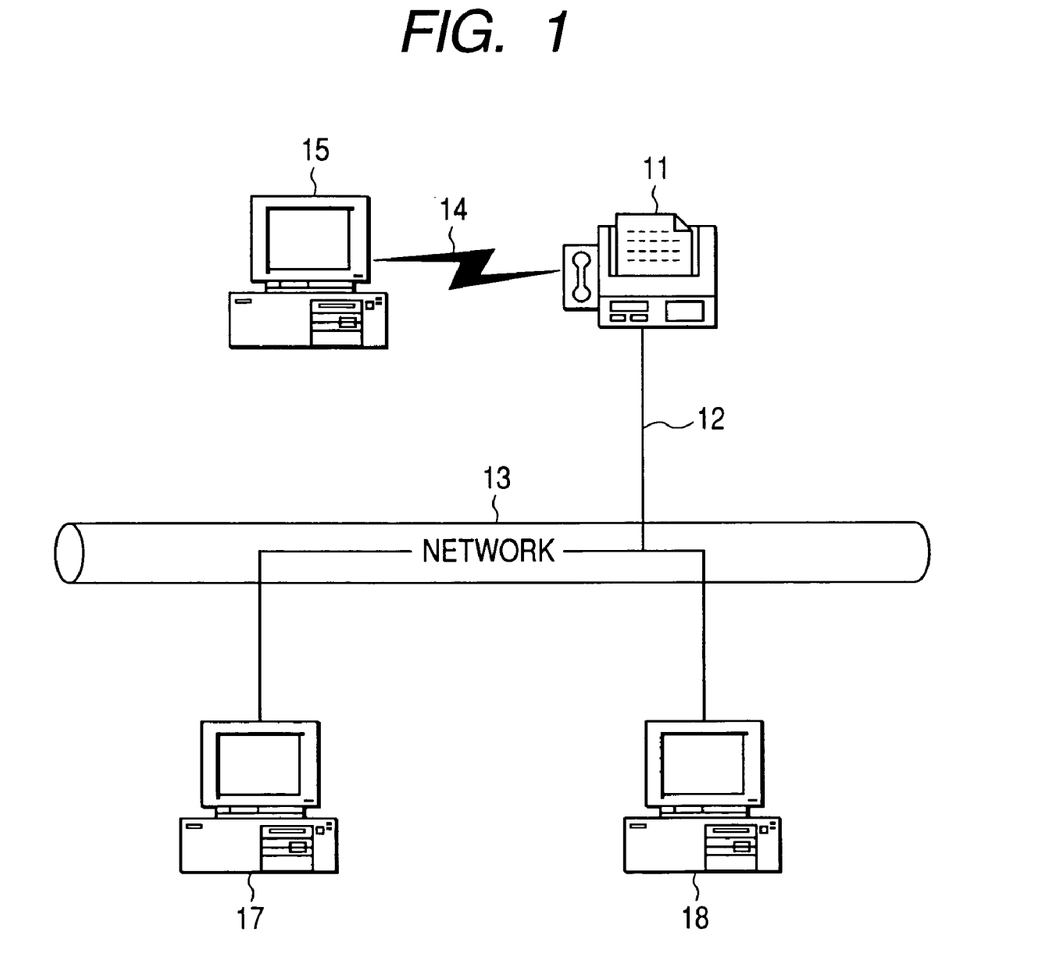
FIG. 1 is an explanatory diagram showing an operating environment of a communication apparatus where the present invention is applied.

FIG. 1 shows an operating environment of a communication apparatus (11) where the present invention is adopted. In FIG. 1, reference numeral 11 (communication apparatus) is connected to a network 13 through a network interface 12 in the communication apparatus of the present invention. Although the configuration of the network 13 is arbitrary, here, an IP network constituted on CSMA/CD (Ethernet: proprietary name) which may be most widespread will be considered. Network hosts such as other computers 16, 17, . . . are located on the network 13.

In addition, the communication apparatus 11 is connected to the computer (PC) 15 as a host apparatus through a local interface 14. USB, IEEE 1284, IEEE1394, or the like can be used as the local interface 14.

Here, the communication apparatus 11 shall have a configuration like a facsimile machine or MFP (multifunctional peripheral). A facsimile machine has image input-output means, can perform facsimile communication through a telephone line (not shown) or the network interface 12, and not only performs facsimile communication according to a request by the computer 15, but also can access the information on the communication apparatus 11 (communication data, management information, setup information, and the like) through the local interface 14 (or, via the network 13).

Figure 2:
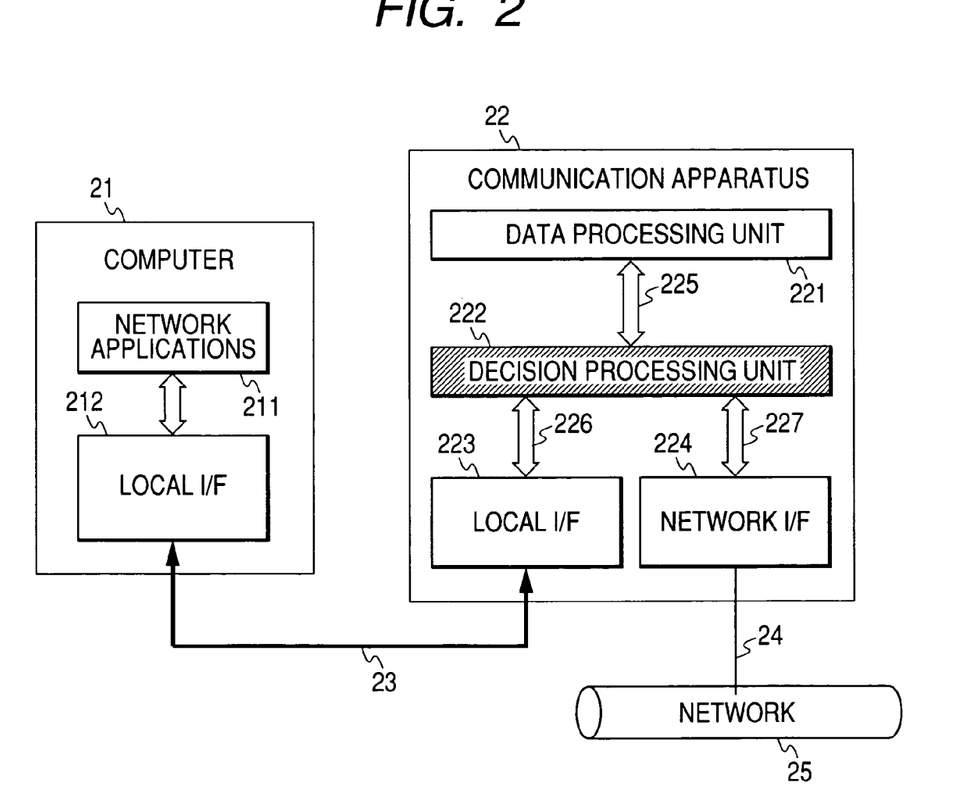
FIG. 2 is an explanatory diagram showing schematically the hardware and software configuration of a communication apparatus and a computer.

FIG. 2 shows schematically the configuration of the main part with regard to this embodiment of a control system of the communication apparatus 11 and computer 15. In FIG. 2, the illustrations of portions which do not relate to this embodiment are omitted. For example, a CPU, memory, and an HDD in the computer 15, and configuration like an image input-output unit and a communication line interface in the communication apparatus 11 are not shown as such are naturally provided.

In FIG. 2, reference numeral 21 denotes the configuration corresponding to a function part in this embodiment of the computer 15 of FIG. 1, which is constituted of a network application 211 and a local interface 212.

The local interface 212 of the computer 15 is connected with a local interface 223 of a communication apparatus 22 (corresponding to the communication apparatus 11 of FIG. 1) as shown in reference numeral 23 (path corresponding to the local interface 14 of FIG. 1).

In addition, reference numeral 22 denotes the configuration corresponding to a functional part of the communication apparatus 11 of FIG. 1 in this embodiment, and a data processing unit 221 and a decision processing unit 222 are connected with an internal interface 225. The decision processing unit 222 is connected with a network interface 224 through an internal interface 227 while being connected with the local interface 223 through an internal interface 226. The network interface 224 is connected with a network 25 (corresponding to the network 13 of FIG. 1) like the reference numeral 24.

In FIG. 2, the data processing unit 221 and decision processing unit 222 control the below-mentioned communication processing, and are constituted of the hardware of a CPU and memory, and software for the CPU.

Figure 3:
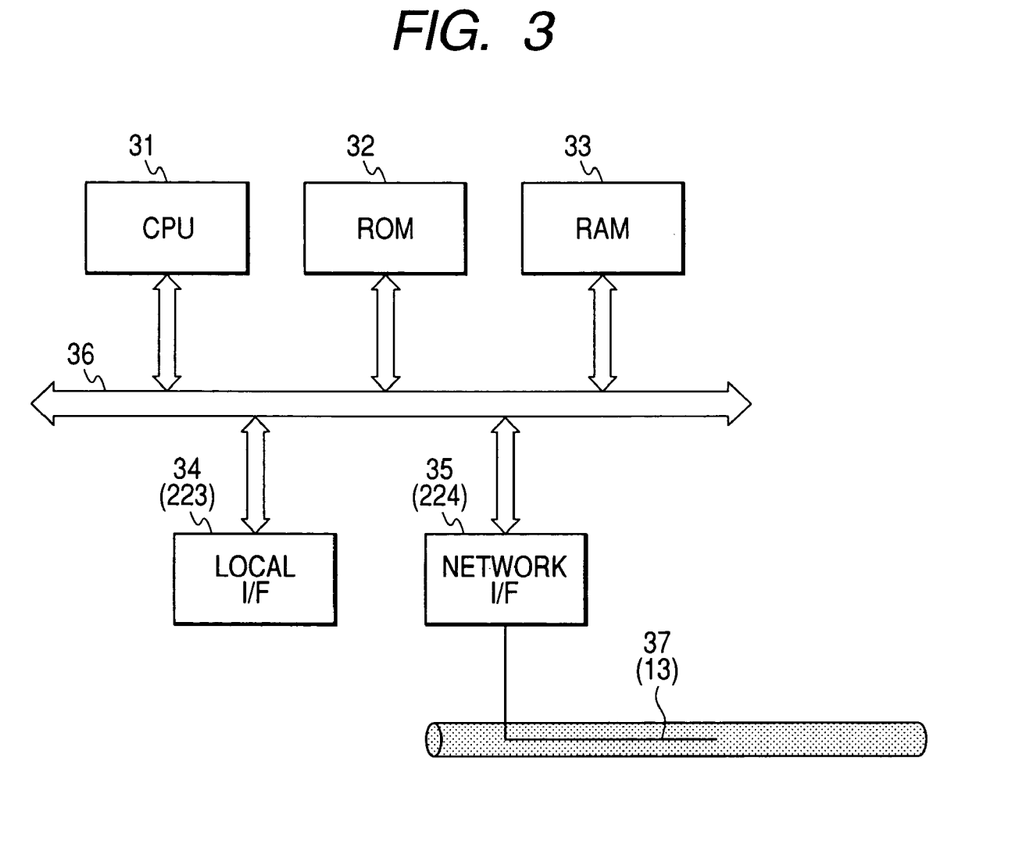
FIG. 3 is a block diagram showing the hardware configuration of a control system of a communication apparatus.

FIG. 3 shows the configuration of a control system of the communication apparatus 11 of FIG. 1. In FIG. 3, the reference numeral 31 denotes a CPU, and this CPU 31 performs the operation instruction of a local interface 34 and a network interface 35 according to a control program stored in ROM 32.

Various kinds of control parameters used for the below-mentioned program (FIGS. 4 to 8) and the control of an apparatus are stored in the ROM 32.

RAM 33 is used not only as a work area of the CPU 31, but also for storing data received from the local interface 34 and network interface 35.

The local interface 34 is for sending and receiving data between with the computer 15, and is constituted on the basis of interface standards such as a serial port, USB, IEEE1284, and IEEE1394.

The network interface 35 is for sending and receiving data between with a network 37 (equivalent to the network 13 of FIG. 1), and is constituted of a NIC (Network Interface Card) of CSMA/CD, for example.

The above-mentioned respective blocks are connected via a system bus 36 (equivalent to each internal interface in the right-hand side of FIG. 2).

The network 37 of FIG. 3 is a network where the communication apparatus 11 is connected, and is equivalent to the network 13 of FIG. 1 (hereafter, the reference numeral 37 is used for the networks).

Although the local interface 34 of the communication apparatus shown in FIG. 2 (reference numeral 11 of FIG. 1) is constituted of a USB or the like in the above-mentioned configuration, usually, this kind of interface is used, and in particular, when connecting a facsimile, a printer, etc. like this embodiment, protocols, different from the network protocols, such as a SCSI, an IEEE1284, and the like are used.

Nevertheless, in this embodiment, the communication apparatus 11 communicates using the same network protocol (TCP/IP, UDP/IP, or the like) as what is used in the network 37 side, when communicating with the computer 15 via local interface 34.

Thereby, when accessing from the computer 15 to the communication apparatus 11 through a local interface, it is possible to use the same application (for example, a WEB browser) as that which is usually used for a resource on a network.

In addition, as another merit obtained by using the same network protocol as that which is used in the network 37 side when communicating on the computer 15 and local interface 34 in this way, it becomes possible for the communication apparatus 11 to provide service (domain name service) as a router which performs the routing of the input-output packet to a computer 15 and as a DNS (domain name server).

In this way, in order to generate an IP network communication path on the local interface 34 (e.g., with an USB or the like), it is conceivable to use a PPP (Point to Point Protocol: RFC1661, RFC2153, STD51, or the like) which can generate network connection without being dependent on the hardware configuration of an interface.

Although many implementation systems of PPP were used on a serial port in its early stage, now PPPoE (PPP Over Ethernet (proprietary name): RFC2516) or the like installed in a form of tunneling the PPP on a CSMA/CD is widely used for the network connection of a PC and an ADSL Modem, and the like.

Since the PPP is not dependent on the hardware configuration of an interface, supposing the local interface 34 is a USB, it is possible to generate the point-to-point network connection on the local interface 34 with the USB by using the PPP (similarly to the case of the PPPoE).

A PPP layer which the computer 15 and communication apparatus 11 uses may be incorporated in a part of an OS of the computer 15 and communication apparatus 11 in a form of software like a network driver.

Next, communication control in the above-mentioned configuration will be described. FIGS. 4 to 8 show flows of a communication control program executed in the communication apparatus 11 of FIG. 1. The procedure shown is stored in the ROM 32 (or another memory medium) as a control program of the CPU 31 of FIG. 3.

Figure 4:
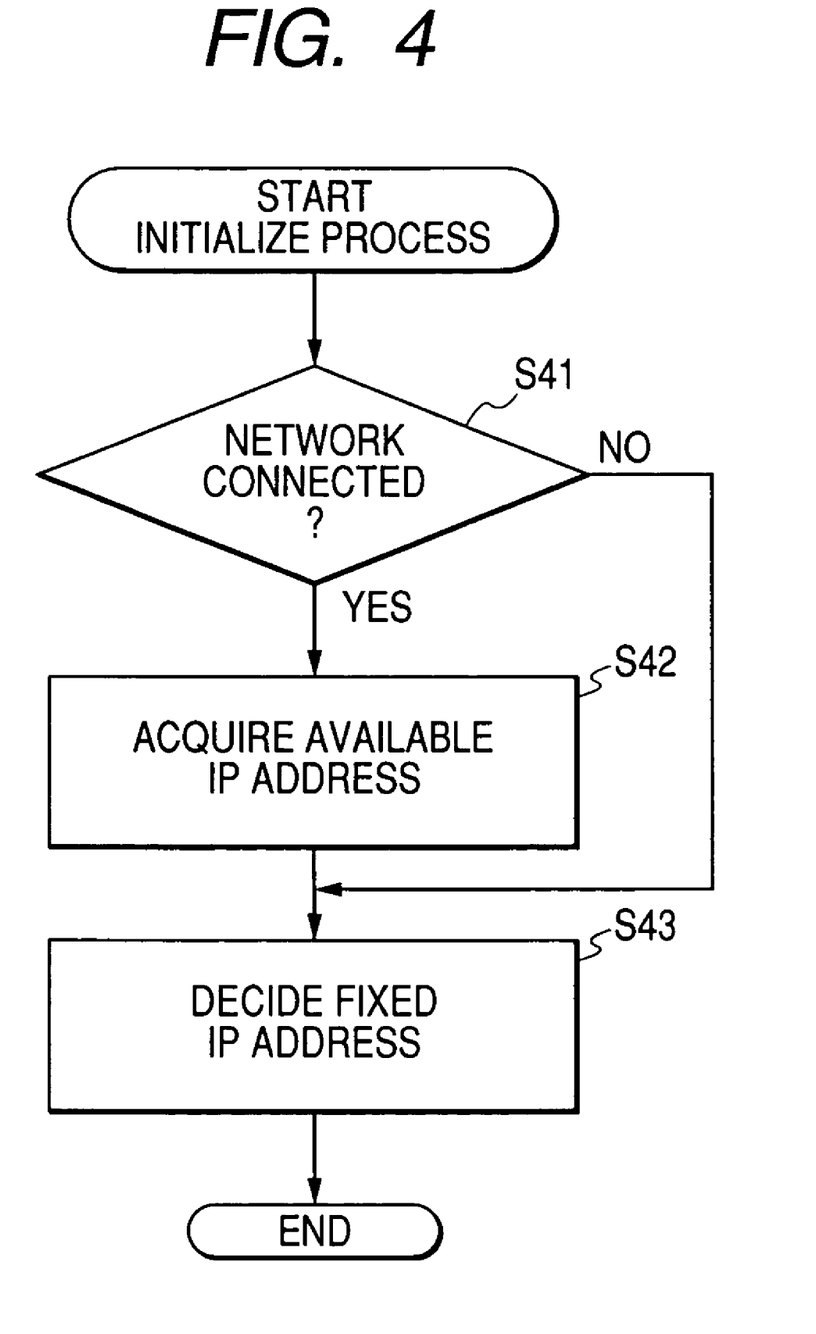
FIG. 4 is a flowchart showing a procedure at the time of initialization of a communication apparatus.

FIG. 4 shows the initialization processing executed according to power-on of the communication apparatus 11. The processing of FIG. 4 can be executed in the PPP layer of the communication apparatus 11 in the case of using the PPP.

At step S41 of FIG. 4, the CPU 31 confirms whether the network 37 (reference numeral 13 of FIG. 1; hereafter, reference numeral 37 is used) is connected to the network interface 35. Here, when the communication apparatus is connected to the network through the network interface 35, the process goes to step S42, and when network connection is not performed, the process goes to step S43.

At step S42, the communication apparatus of the present invention acquires an available IP address through the network interface 35. The IP address acquired is stored in a predetermined area of the RAM 33 as its own effective IP address (communication apparatus 11) in the network 37 side. In the case of the DHCP and IPv6, it is possible to acquire the IP address (moreover including the setting of a DNS address, a default gateway address, and the like) by an IP address acquisition protocol of the IPv6.

The process goes to step S43 after step S42. In addition, also when the network connection is not performed at step S41, step S43 is executed.

At this step S43, a fixed IP address beforehand stored in the ROM 32 or RAM 33 is acquired. The IP address acquired is stored in the RAM 33 as the own effective IP address in the local interface 34 side. As mentioned above, although the communication apparatus 11 communicates using a network protocol through the computer 15 and local interface 34, the computer 15 accesses the communication apparatus 11 using this fixed address. The communication with the computer 15 can also be performed using this fixed IP address in the state that there is no connection of the communication apparatus 11 with the network 37 side.

The network addresses (in the network 37 side and local interface 34 side) of the communication apparatus 11 can be decided as mentioned above. The computer 15 can access a resource of the communication apparatus 11 using the above-mentioned fixed IP address (step S43). For example, an HTTP server function is prepared for the communication apparatus 11, and the communication data, management information, setup information, and the like of the communication apparatus 11 are read or changed. Alternatively, when a user interface for requesting facsimile communication is provided as a WEB page, it is possible to perform the operation of reading or changing such communication data, management information, setup information, and the like of the communication apparatus 11, or the operation of requesting facsimile communication using a WEB browser from the computer 15.

For example, when accessing the setup information of the communication apparatus 11 and the fixed IP address of the communication apparatus 11 is "192.168.1.1", it is possible to perform the setup of the communication apparatus 11 by specifying such an address as "http://192.168.1.1/Setup/" from the WEB browser of the computer 15.

According to such configuration, even if the communication apparatus 11 is connected through a local interface like a USB, it is not necessary to prepare an application dedicated for the local interface for accessing the communication apparatus 11 like the conventional in the computer 15 side. The computer 15 can use the same network application as the (general purpose) software used for accessing another communication apparatus 11 and another computer on the network.

In addition, the communication apparatus 11 can also provide service of a router and a DNS for the computer 15. For example, the fixed IP address of the communication apparatus 11 is registered as a default gateway address (default route) of the computer 15, and it is set that all external-oriented IP packets are sent to the communication apparatus 11 via the local interface from the computer 15. On the other hand, it is possible to make the communication apparatus 11 function as a router by the communication apparatus 11 routing the sent and received packets between the network 37 and local interface 34.

Furthermore, it is also possible to provide a DNS, that is, a computer 15 can also be provided with DNS, that is, host name solution service by implementing the DNS service in the communication apparatus 11.

Figure 5:
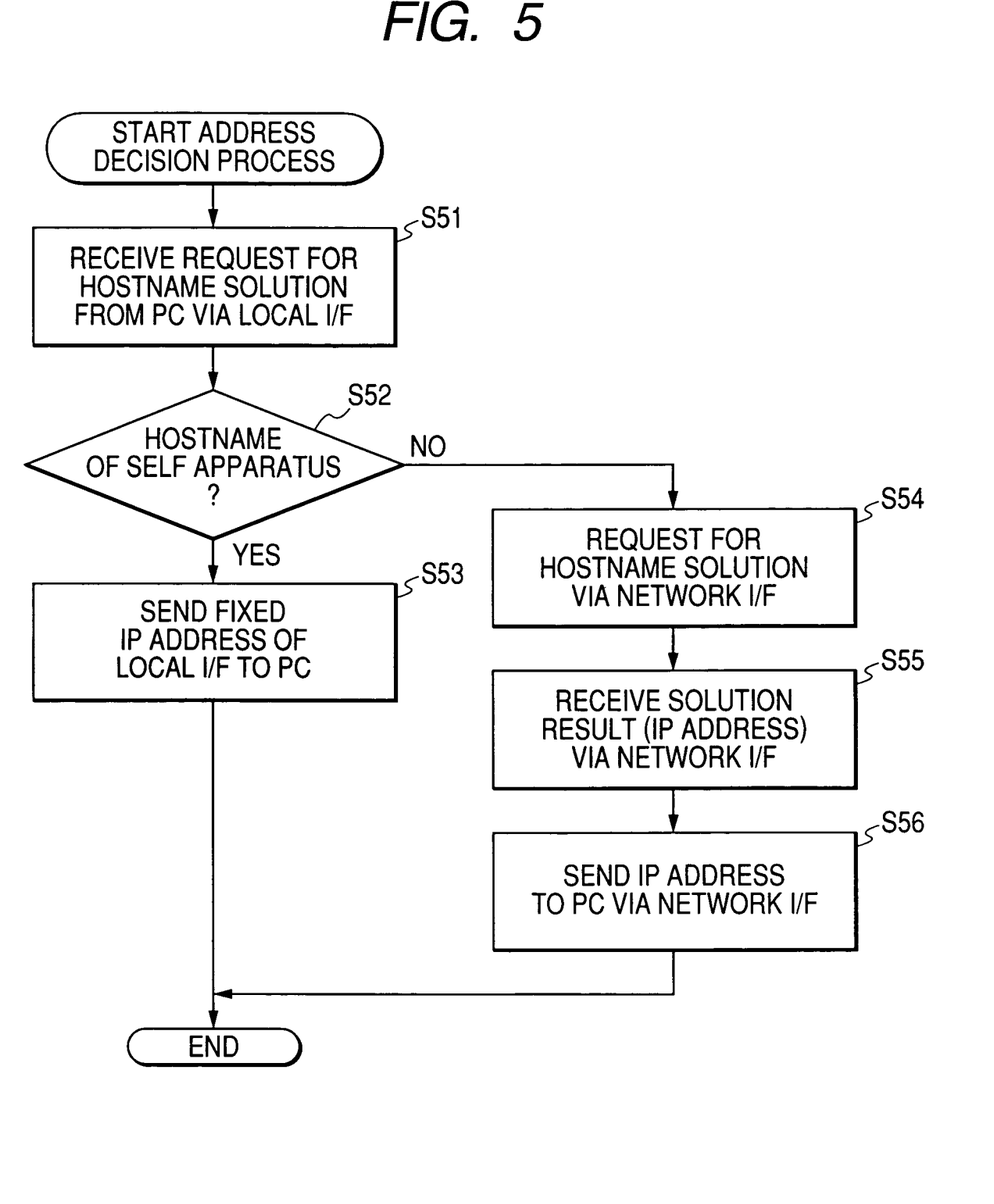
FIG. 5 is a flowchart showing a procedure of address solution service of a communication apparatus.

FIG. 5 shows a processing example in the case of installing the DNS service in the communication apparatus 11 receiving a request to decide an address, from the computer 15 through the local interface 34 in the communication apparatus 11. In addition, FIG. 5 shows what is executed when there exists the network connection at step S41 of FIG. 4.

At step S51, a request of the host name solution is received from the computer 15 through the local interface 34. This host name solution request is sent by receiving a prescribed request through a port 53 of TCP or UDP.

At step S52, it is decided whether the host name data received by the host name solution request at step S51 is equal to the own host name (communication apparatus 11) beforehand stored in the ROM 32 or RAM 33.

When the host name, the solution of which is requested at step S52, is equal to the own host name, the process goes to step S53, and when not equal, the process goes to step S54.

At step S53, the own fixed IP address decided at step S43 of FIG. 4 is reported to the computer 15 through the local interface 34.

On the other hand, at step S54, the solution request of a host name is sent through the network interface 12. The solution request of this host name is performed by sending the solution request to an upper DNS which is located on the network 37 and which was set beforehand.

At step S55, the IP address as a result of the host name solution is received from the upper DNS which the request is sent at step S54.

At step S56, the IP address received at step S55 is sent to the computer 15 through the local interface 34.

In this way, according to the configuration of performing network communication between with the computer 15 also on the local interface 34, DNS service can be provided to the computer 15. In the computer 15 side, the fixed IP address (step S43) of the communication apparatus 11 may be set as a DNS address at the time of the network setup of an OS. When it is a normal OS and the name resolution becomes necessary, an address solution request (step S51) is sent automatically.

Figure 6:
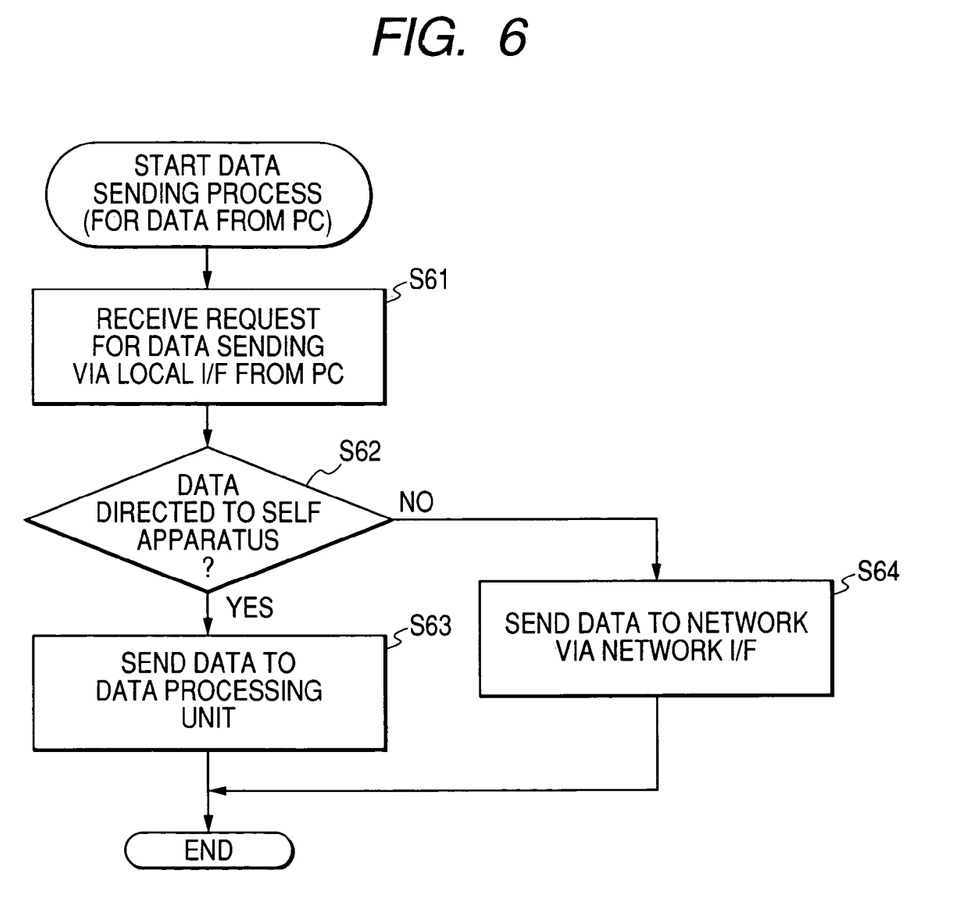
FIG. 6 is a flowchart showing a routing processing procedure of a communication apparatus.
Figure 7:
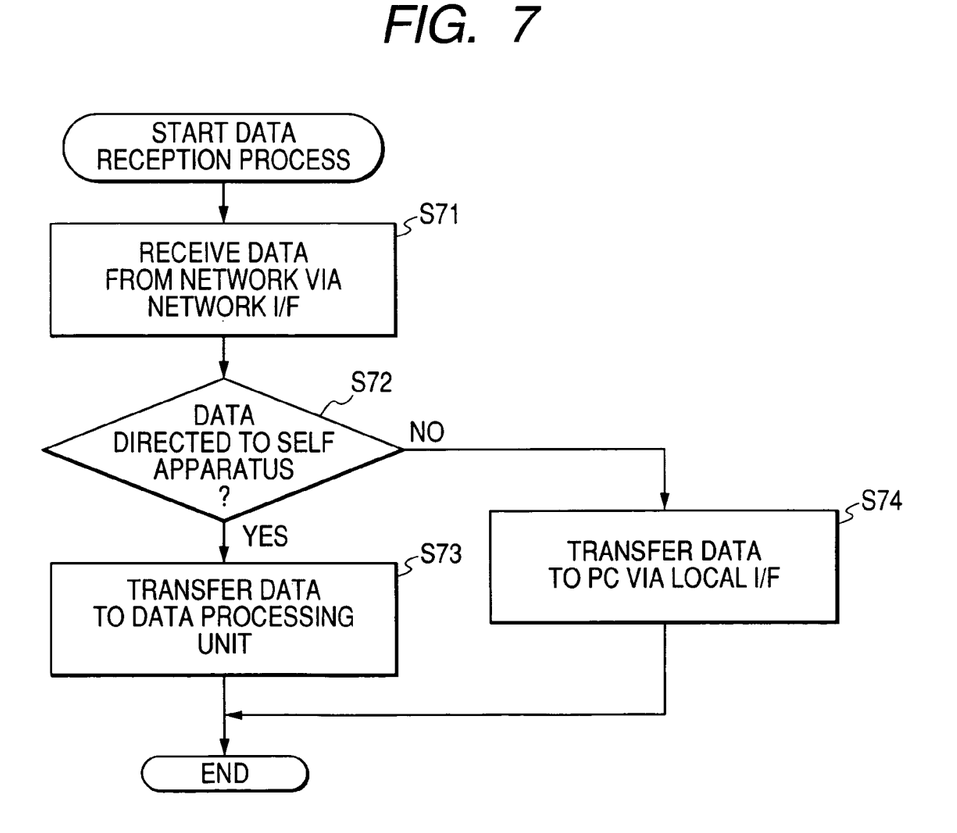
FIG. 7 is a flowchart showing a routing processing procedure of a communication apparatus.
Figure 8:
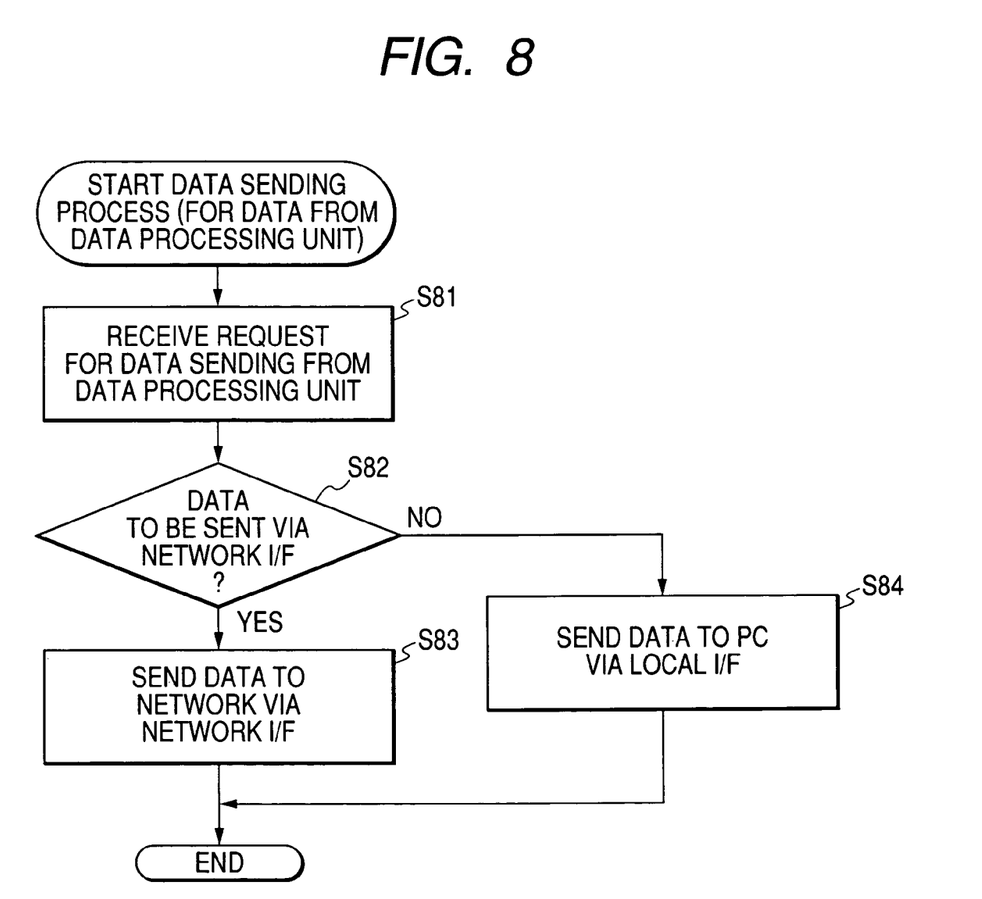
FIG. 8 is a flowchart showing a routing processing procedure of a communication apparatus.

FIGS. 6 to 8 show examples of the processing of operating the communication apparatus as a router as mentioned above.

FIG. 6 shows the processing in the case that the communication apparatus 11 receives a request of data sending from the computer 15 through the local interface 34.

At step S61 of FIG. 6, the request of data sending is received from the computer 15 through the local interface 34. By setting the fixed IP address of the communication apparatus 11 as a default gateway address of the computer 15, all the sent packets are sent to the communication apparatus 11 via the local interface 34 regardless of destination addresses when the application of the computer 15 performs network sending process, and these sent packets are received at step S61.

Step S62 decides whether the sent data received at step S61 is the data directed to a self apparatus. Specifically, it is performed by deciding whether the own fixed IP address in the local interface side set at step S43 of FIG. 4 and a destination address of the sent packet coincide.

Here, when the sent data received at step S61 is data directed to the self apparatus, at step S63, the processing of passing the sent data received at step S61 to the data processing unit 221 of FIG. 2 is performed.

In addition, when the sent data received at step S61 is not the data directed to the self apparatus, the sent data received is passed to the network interface 35 at step S64. At step S64, the sent data is transferred to the default gateway address which the communication apparatus 11 uses. In addition, the default gateway address which the communication apparatus 11 uses is set manually beforehand or can also be concurrently set at step S42 (FIG. 4) in the case of using a DHCP or the like.

In this way, the communication apparatus 11 can process the data, which is directed to the self apparatus and is received from the computer 15, by the self apparatus, and can perform the routing of other data to the network 37 side. In addition, image data which should be sent by fax, the above-mentioned setup information of the communication apparatus 11, and the like are included in these data directed to the self apparatus.

On the other hand, FIG. 7 shows the processing at the time of receiving data from the network 37 conversely. At step S71 of FIG. 7, when the received data are received from the network 37 through the network interface 35, the received packet received at step S71 is decided at step S72 whether it is data directed to the self apparatus. This decision is performed by deciding whether a destination of the receive packet coincides with the own address in the global interface side (this is set at step S42 of FIG. 4), similarly to that of the above-mentioned step S62.

Here, when the received data received at step S71 is data directed to the self apparatus, at step S73, the processing of passing the received data received at step S71 to the data processing unit 221 is performed.

In addition, when the sent data received at step S72 is not the data directed to self apparatus, the received data received is passed to the computer 15 through the local interface 34 at step S74.

In this way, the communication apparatus 11 can process the data, which is directed to the self apparatus and is received from the network 37, by the self apparatus, and can perform the routing of other data to the computer 15 side. In addition, similarly to the above, image data which should be sent by fax, the above-mentioned setup information of the communication apparatus 11, and the like are included in these data directed to the self apparatus. Hence, it is possible to perform the setup of equipment, facsimile sending, and the like on the basis of a request of the host (e.g., computers 16 and 17 of FIG. 1) in the network 37 side.

FIG. 8 shows the processing in the case that the network transmission data which should be sent to the data processing unit 221 in the communication apparatus 11 is generated. In the case that the communication apparatus 11 performs network facsimile sending, and receives data directed to the self apparatus by the processing in FIGS. 7 and 8 and responds to this, the network transmission data which should be sent is generated naturally. FIG. 8 shows the handling of such network transmission data.

In this case, when a request of the data transmission from the data processing unit 221 is received at step S81 of FIG. 8, it is decided at step S82 whether the destination IP address of the transmitted packet received at step S81 is the data which should be transmitted via the network interface 35, or the data which should be transmitted via the local interface 34. This decision can be performed, for example, by investigating whether the destination IP address belongs to a network segment to which the network interface 35 belongs.

In the case that the destination IP address of the transmitted packet received at step S81 means the data which should be transmitted via the network interface 35, the process goes to step S83, and in the case of the data which should be transmitted via the local interface 34, it shifts to step S84.

Then, the transmitted data received at step S81 is transmitted to the network 37 through the network interface 35 at step S83, and the transmitted data received at step S81 is transmitted to the computer 15 through the local interface 34 at step S84.

As mentioned above, the communication apparatus 11 can perform the network facsimile communication to equipment in the network 37 side, and can return the response data which becomes necessary by the request (at step S63 of FIG. 6 and step S73 of FIG. 7) to the self apparatus.

As apparent from the above, this embodiment adopts the configuration of generating an IP network communication path on a local interface of a communication apparatus 11 and communicating with a computer 15 as a host apparatus through the IP network communication path on the local interface.

Thereby, it is not necessary to prepare software for accessing a communication apparatus for every interface of accessing the communication apparatus like the conventional, separately for a host apparatus. A user in the host apparatus side can use the same network application as general-purpose software (WEB browser and the like) for accessing other computers, for example, for the user's operation or setup operation of the communication apparatus without being limited to the interface of accessing the communication apparatus, and can use a unified user interface for a user.

In addition, by generating an IP network communication path on a local interface, it is possible to provide domain name service through the local interface to a host apparatus, or to provide the service as a router which performs the routing of IP packets between the IP network communication path on the local interface, the network connected to the network interface, and the own data processing means. Hence, without using special server hardware or router hardware, this service can be provided for the host apparatus by the communication apparatus.

In addition, what is shown in the above is an example of generating an IP communication path on a local interface between a PC and a communication apparatus, and performing such configuration that a real IP packet flows on the local interface. Nevertheless, it is not always necessary to have such configuration that an IP packet flows on a local interface, and it is possible to achieve almost all the objects of the above-mentioned embodiment so long as a necessary resource of a communication apparatus may appear as a network resource on an IP network from the PC side. For this, it is considerable, for example, to build in necessary software in the PC side or in the local network driver of the communication apparatus, and to perform such configuration that the communication between with the communication apparatus is visible as IP communication from an application in the PC (in this case, a format of data which flows on the local interface is arbitrary). It is also possible to achieve an effect equivalent to the above in the case of using such virtual IP network configuration on a local interface.

Figure 9:
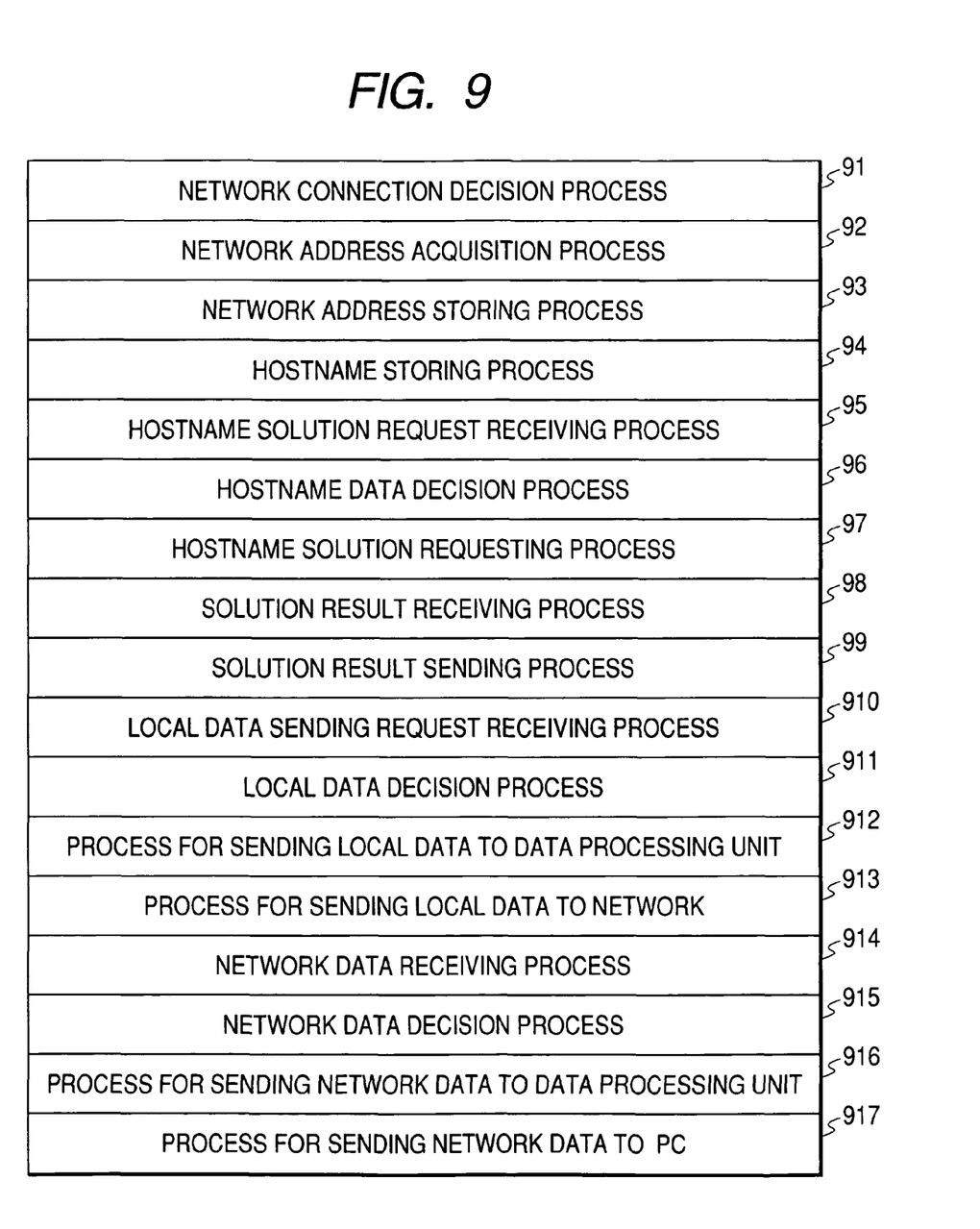
FIG. 9 is an explanatory diagram showing a storing aspect of software which implements the present invention.

FIG. 9 shows how each process step of the control program of the CPU 31 in the communication apparatus 11 is storable in ROM 32.

In FIG. 9, reference numeral 91 denotes an area where a process step of deciding whether the communication apparatus 11 is connected to the network 13 is stored.

Reference numeral 92 denotes an area where a step of acquiring an IP address from the network 25 through the network interface 35 is stored.

Reference numeral 93 denotes an area where a process step of acquiring an IP address stored in the ROM 32 or RAM 33 is stored.

Reference numeral 94 denotes an area where a process step of acquiring a host name of the communication apparatus 11 stored in the ROM 32 or RAM 33 is stored.

The software in the areas 93 and 94 can be constituted of network driver software of the above-mentioned DHCP or IPv6.

Reference numeral 95 denotes an area where a process step of receiving a host name solution request sent from the computer 15 is stored.

Reference numeral 96 denotes an area where a process step of comparing the host name acquired at the process step 94 with the host name requested from the computer 15 at the process step 95 is stored.

Reference numeral 97 denotes an area where a process step of performing a host name solution request to a network through the network interface 35 about the host name requested from the computer 15 at the process step 95 is stored.

Reference numeral 98 denotes an area where a process step of receiving the result of the host name solution, requested to the network interface 35 at step 97, from the network interface 35 is stored.

Reference numeral 99 denotes an area where a process step of sending the solved IP address to the computer 15 through the local network 223 is stored.

The software in the areas 95 to 99 can be constituted as server software which provides the above-mentioned DNS service.

Reference numeral 910 denotes an area where a process step of receiving a request of data sending sent to the local network 223 through the computer 15 is stored.

Reference numeral 911 denotes an area where a process step of deciding whether the transmission destination IP address of the transmitted data received at step 910 is equal to the IP address decided at steps of the areas 94 to 99 is stored.

Reference numeral 912 denotes an area where a process step of sending the transmitted data received at the process step 910 to the data processing unit 221 is stored.

Reference numeral 913 denotes an area where a process step of transmitting the received data received at the process step 910 to the network 25 through the network interface 35 is stored.

Reference numeral 914 denotes an area where a process step of acquiring the received data received from the network 25 through the network interface 35 is stored.

Reference numeral 915 denotes an area where a process step of deciding whether the transmission destination IP address of the received data received at step 914 is equal to the IP address decided at steps of the areas 94 to 99 is stored.

Reference numeral 916 denotes an area where a process step of sending the received data received at the process step 914 to the data processing unit 221 is stored.

Reference numeral 917 denotes an area where a process step of transmitting the received data received at the process step 914 to the computer 15 through the local interface 226 is stored.

The software in the areas 910 to 917 can be constituted of router software which performs IP routing.

The present invention can be implemented without being actually limited to what kind of communication processing a communication apparatus performs so long as it is a communication apparatus which has a network interface and a local interface for connecting with a PC (computer). It is possible to make software for achieving the method and program of the present invention stored in other memory media such as a floppy disk (proprietary name), CDROM, a hard disk, a memory card, and a magneto-optical disk without being limited to the above-mentioned ROM (RAM), and it is also possible to have such configuration that can introduce the software into these devices via a network, and can update it.

This application claims priority from Japanese Patent Application No. 2004-206671 filed on Jul. 14, 2004, which is hereby incorporated by reference herein.

What is claimed is:

1. A control method of a communication apparatus which performs facsimile communication processing while having (a) a local interface for connecting with a host apparatus, the local interface using USB, IEEE1284, or IEEE1394, and (b) a network interface for connecting with an IP network, wherein said control method comprises the steps of:

setting a fixed IP address as an IP address of the communication apparatus for the local interface even when there is no connection with the network interface;

generating an IP network communication path on the local interface using a protocol not dependent on an interface hardware so that the communication apparatus can be observed as a source on the IP network from the host apparatus connected to the local interface; and communicating with the host apparatus connected to the local interface via the IP network communication path having been generated on the local interface using a protocol not dependent on an interface hardware, and with another host apparatus via the IP network connected to the network interface, wherein said communicating step comprises the steps of:

(a) routing communication performed between the host apparatus and the IP network via the network interface and the local interface;

(b) receiving image data to be facsimile-transmitted and setup information of the communication apparatus from the host apparatus or the another host apparatus; and (c) providing a web page which is a user interface for accessing the setup information of the communication apparatus, and wherein said communicating step accesses the setup information by specifying an address consisting of the fixed IP address and additional information from a web browser of the host apparatus, and accesses the setup information by specifying an address consisting of an IP address obtained via the network interface and additional information from a web browser of the another host apparatus.

2. The control method of a communication apparatus according to claim 1, wherein the host apparatus uses a general-purpose network application in order to access the communication apparatus through the local interface.

3. The control method of a communication apparatus according to claim 2, wherein the communication apparatus has communication data, management information, or setup information, and
wherein the communication data, management information, or setup information of the communication apparatus are read and changed by using a web browser via the communication path.

4. The control method of a communication apparatus according to claim 1, further comprising providing domain name service for the host apparatus through the local interface.

5. The control method of a communication apparatus according to claim 1, wherein whether or not an IP packet received via the communication path on the local interface is directed to the communication apparatus is determined, and if the determination is affirmative, the received data is sent to a data processing device of the communication apparatus, while if it is not, the received data is sent to the network via the network interface, and
wherein whether or not an IP packet received via the network interface is directed to the communication apparatus is determined, and if the determination is affirmative, the received data is sent to a data processing device of the communication apparatus, while if it is not, the received data is sent to the host apparatus via the local interface.

6. The control method of a communication apparatus according to claim 1, wherein the communication path is generated using PPP.

7. A memory medium to store a control program of a communication apparatus, the control program including an apparatus-executable program for performing the control method of a communication apparatus according to any one of claims 1 to 5.

8. A communication apparatus which performs facsimile communication processing, the communication apparatus comprising:
a local interface for connecting with a host apparatus, the local interface using USB, IEEE1284, or IEEE1394;
a network interface for connecting with an IP network;
a unit which set a fixed IP address as an IP address of the communication apparatus for the local interface even when there is no connection with the network interface;
a unit which generates an IP network communication path on the local interface using a protocol not dependent on an interface hardware so that the communication apparatus can be observed as a source on the IP network from the host apparatus connected to the local interface;
a unit which communicates with the host apparatus connected to the local interface via the IP network communication path having been generated on the local interface using a protocol not dependent on an interface hardware, and which communicates with another host apparatus via the IP network connected to the network interface,
wherein said communicating unit comprises:
(a) a unit which routes communication performed between the host apparatus and the IP network via the network interface and the local interface;
(b) a unit which receives image data to be facsimile-transmitted and setup information of the communication apparatus from the host apparatus or the another host apparatus; and
(c) a unit which provides a web page which is a user interface for accessing the setup information of the communication apparatus, and
wherein the setup information is accessed by from a web browser of the host apparatus by specifying an address consisting of the fixed IP address and additional information, and is accessed from a web browser of the another host apparatus by specifying an address consisting of an IP address obtained via the network interface and additional information.

9. A communication apparatus according to claim 8, wherein the host apparatus uses a general-purpose network application in order to access the communication apparatus through the local interface.

10. A communication apparatus according to claim 9, wherein the communication apparatus has communication data, management information, or setup information, and
wherein the communication data, management information, or setup information of the communication apparatus are read and changed by using a web browser via the communication path.

11. A communication apparatus according to claim 8, further comprising a unit which provides domain name service for the host apparatus through the local interface.

12. A communication apparatus according to claim 8, wherein whether or not an IP packet received via the communication path on the local interface is directed to the communication apparatus is determined, and if the determination is affirmative, the received data is sent to a data processing device of the communication apparatus, while if it is not, the received data is sent to the network via the network interface, and
wherein whether or not an IP packet received via the network interface is directed to the communication apparatus is determined, and if the determination is affirmative, the received data is sent to a data processing device of the communication apparatus, while if it is not, the received data is sent to the host apparatus via the local interface.

13. A communication apparatus according to claim 8, wherein the communication path is generated using PPP.

* * * * *